United States Patent
Tanikawa

(10) Patent No.: US 6,945,902 B2
(45) Date of Patent: Sep. 20, 2005

(54) OUTPUT SHAFT SUPPORTING APPARATUS FOR AUTOMATIC TRANSMISSION

(75) Inventor: Naoya Tanikawa, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/668,150

(22) Filed: Sep. 24, 2003

(65) Prior Publication Data

US 2004/0121878 A1 Jun. 24, 2004

(30) Foreign Application Priority Data

Sep. 25, 2002 (JP) .................................. 2002-279536

(51) Int. Cl.$^7$ .......................... F16H 57/08; B60K 17/24
(52) U.S. Cl. ........................ 475/331; 180/376; 180/379
(58) Field of Search ............................ 475/290, 331, 475/330; 180/376, 377, 379, 369

(56) References Cited

U.S. PATENT DOCUMENTS

| | | | | |
|---|---|---|---|---|
| 3,533,308 A | * | 10/1970 | Noguchi et al. | ............ 475/274 |
| 3,768,337 A | * | 10/1973 | Racicot | ...................... 475/262 |
| 4,387,607 A | * | 6/1983 | Sakakibara | ................. 475/312 |
| 4,484,494 A | * | 11/1984 | Sakakibara | ................. 475/312 |
| 4,615,231 A | * | 10/1986 | Takahashi | .................... 74/467 |
| 4,798,103 A | * | 1/1989 | Eastman et al. | ............ 475/142 |
| 4,944,193 A | * | 7/1990 | Harada et al. | ............. 74/15.86 |
| 6,135,912 A | * | 10/2000 | Tsukamoto et al. | ......... 475/271 |
| 6,344,010 B1 | * | 2/2002 | Tajima et al. | ................ 475/331 |
| 6,592,489 B2 | * | 7/2003 | Tajima et al. | ................ 475/323 |
| 2003/0139246 A1 | * | 7/2003 | Sugiura et al. | ............. 475/279 |

OTHER PUBLICATIONS

"Manual for Toyota new Model Land Cruiser Part No. 61569," *Toyota Motor Cooperation Service Division*, Jan. 17, 1990, Fourth Chapter, Underbody, p. 16.

* cited by examiner

*Primary Examiner*—Tisha Lewis
(74) *Attorney, Agent, or Firm*—Burns, Doane, Swecker & Mathis LLP

(57) ABSTRACT

An output shaft supporting structure includes an output shaft having a hollow space opened in one end side, an intermediate shaft whose one end having an insert portion inserted into the hollow space, an extension housing placed on the edge of a casing, a first bearing and a second bearing disposed between the outer peripheral surface of the output shaft and the inner peripheral surface of the extension housing, a third bearing disposed between the outer peripheral surface of the insert portion and the inner peripheral surface of the hollow space. A part of rotational elements of a planetary gear set is supported between the outer peripheral surface of the insert portion closer to one end of the intermediate shaft than the third bearing and the inner peripheral surface of the hollow space, and at least a portion of axial position of the third bearing is located between the first bearing and the second bearing.

7 Claims, 2 Drawing Sheets

OUTPUT SHAFT SUPPORTING APPARATUS FOR AUTOMATIC TRANSMISSION

This application is based on and claims priority to Japanese Patent Application No. 2002-279536 filed on Sep. 25, 2002, the entire content of which is incorporated herein by reference.

FIELD OF THE INVENTION

This invention relates to an output shaft supporting structure for Automatic Transmission.

BACKGROUND OF THE INVENTION

As a known art for an output shaft supporting structure for automatic transmission, a structure for rotatably supporting an output shaft includes a first ball bearing disposed between the inner peripheral surface of a casing which covers a main body of the automatic transmission and the outer peripheral surface of an output shaft, and a second ball bearing disposed between the inner peripheral surface of an extension housing and the outer peripheral surface of the output shaft. ("MANUAL FOR TOYOTA NEW MODEL LAND CRUISER Part Number 61569" TOYOTA MOTOR COOPERATION SERVICE DIVISION, Jan. 17, 1990, The forth chapter, Underbody, P.16)

In the above identified known art, inclined rotation of the output shaft is prevented as much as possible by setting an axial distance between the first ball bearing and the second ball baring relatively larger. The inclined rotation means that the output shaft rotates inclindly about its rotational center of axis. Generally when setting the distance larger between the two bearings, inclined rotation of the output shaft can be prevented.

According to the above described known art, inclined rotation of the output shaft can be prevented by providing longer space between the ball bearings, however the length of an automatic transmission in axis direction has to be lengthened. Therefore, it is difficult for installing an automatic transmission into a vehicle having very limited space for the transmission.

The present invention therefore seeks to provide an output shaft supporting structure for an automatic transmission capable of shortening the length of an automatic transmission in axial direction and preventing inclined rotation of the output shaft of the automatic transmission.

SUMMARY OF THE INVENTION

According to an aspect of the present invention, an output shaft supporting structure includes an output shaft whose one end positioned at an input shaft side and the other end positioned away from the input shaft side and having a hollow space opened in the one end side, the output shaft decelerating or accelerating the rotation of the input shaft in response to the gear ratio corresponding to a speed change stage, an intermediate shaft coaxially disposed relative to the input shaft and whose one end positioned in the input shaft side and the other end having an insert portion inserted into the hollow space of the output shaft, an extension housing placed on the edge of the other end of the out put shaft in a casing covering the main body of the automatic transmission, a first bearing disposed between the outer peripheral surface of the output shaft and the inner peripheral surface of the extension housing, a second bearing disposed between the inner peripheral surface of the extension housing closer to the other side of the output shaft than the first bearing and the outer peripheral surface of the output shaft, a third bearing disposed between the outer peripheral surface of the insert portion and the inner peripheral surface of the hollow space. A part of rotational elements of a planetary gear set is supported between the outer peripheral surface of the insert portion closer to one end of the intermediate shaft than the third bearing and the inner peripheral surface of the hollow space, and at least a portion of axial position of the third bearing is located between the first bearing and the second bearing.

According to another aspect of the present invention, an external spline engaging with an internal spline formed in the hollow space is formed in the outer peripheral surface of rotational elements of the planetary gear set supported between the outer peripheral surface of the insert portion and the inner peripheral surface of the hollow space, and the inner peripheral surface of the rotational element of the planetary gear set is relatively and rotatably supported relative to the outer peripheral surface of the insert portion.

According to still another aspect of the present invention, clearance between the internal spline and the external spline in radial direction is formed in the hollow space and the clearance is set to be larger than distance in the most inclined position of the intermediate shaft 12 relative to the center of axis in radial direction.

According to still another aspect of the present invention, the rotational element of the planetary gear sets splined with the inner peripheral surface of the hollow space serves as a carrier, and the intermediate shaft serves as a sun gear engaging with a pinion gear of the planetary gear sets, and the outer peripheral surface of one end side of the output shaft relatively and rotatably supports a ring gear of the planetary gear sets.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE INVENTION

Figure 1:
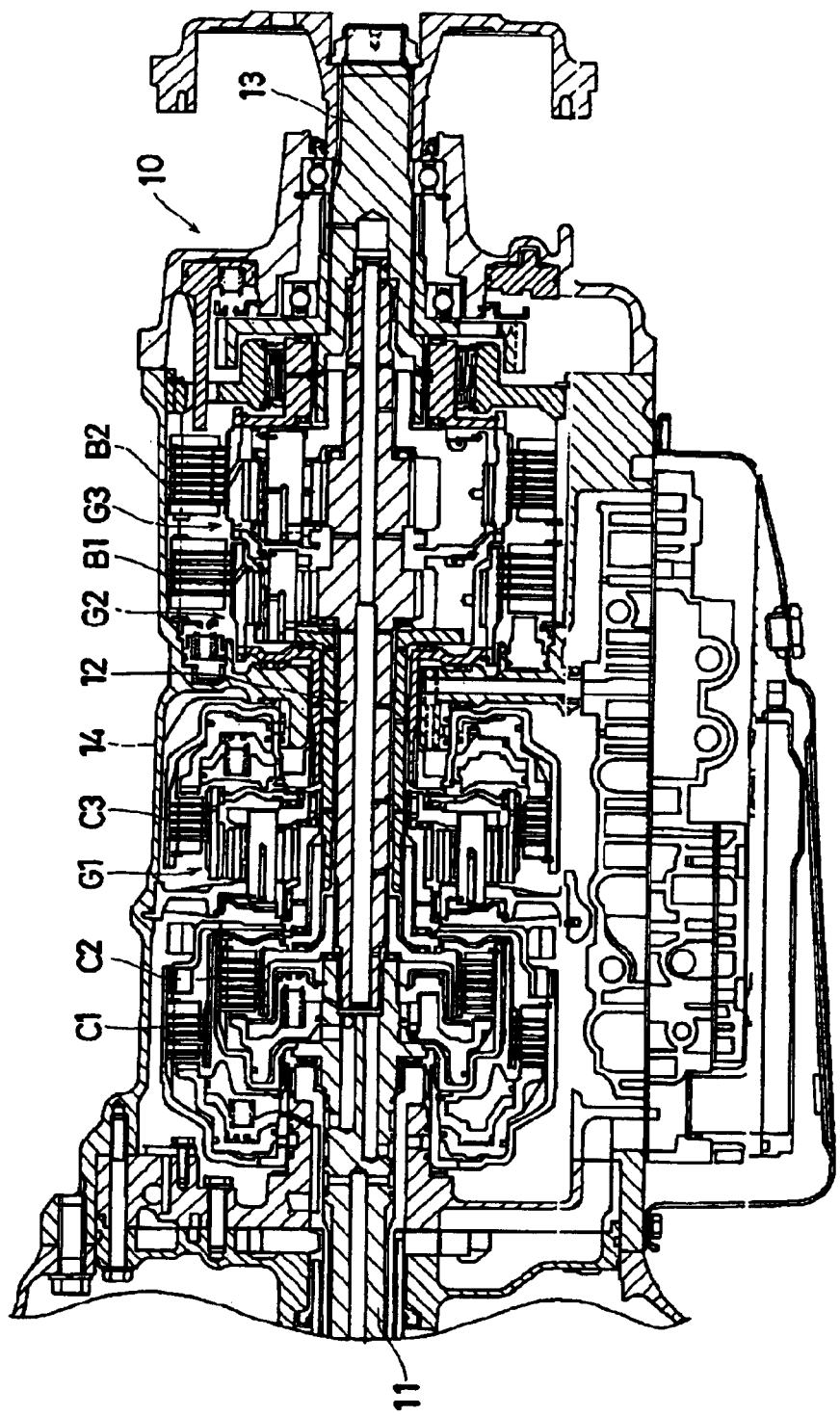
FIG. 1 illustrates a cross sectional view of an entire automatic transmission according to an embodiment of the present invention.
Figure 2:
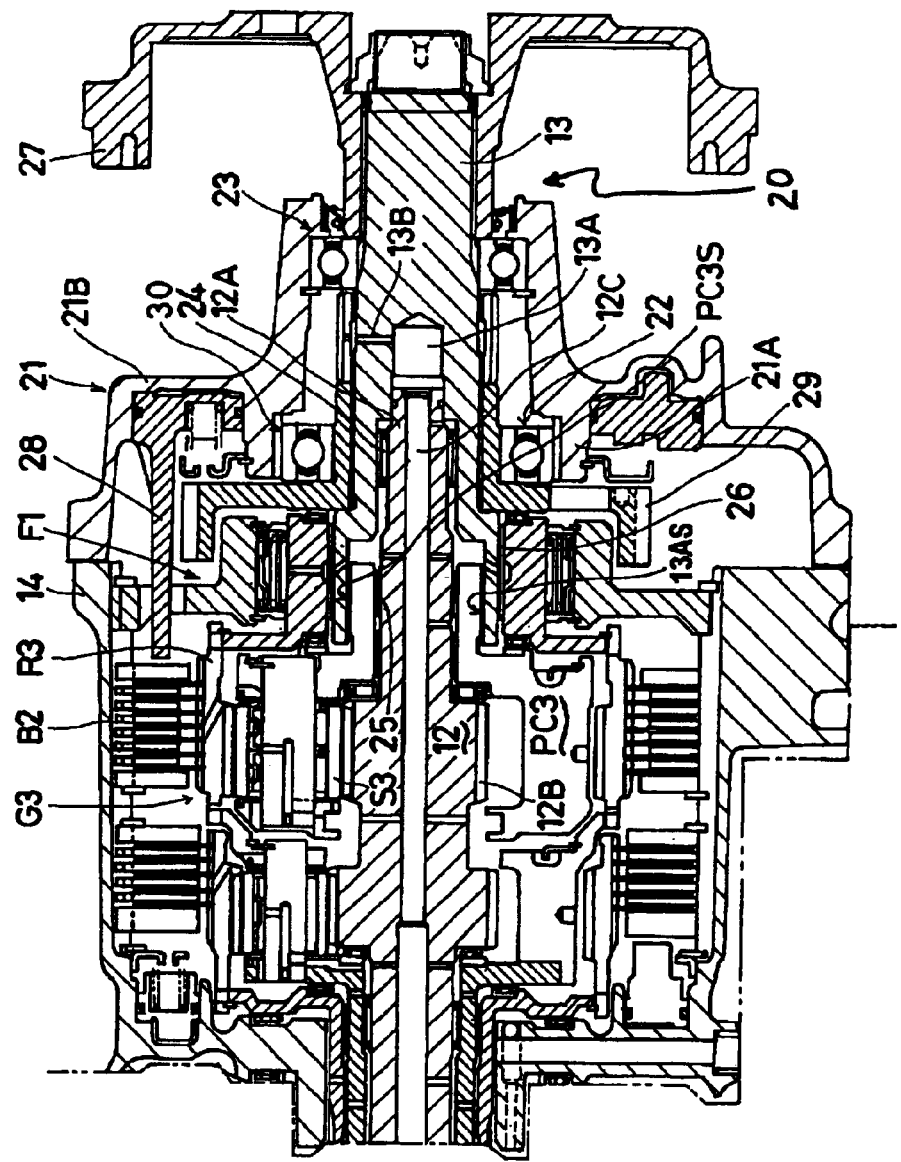
FIG. 2 illustrates a cross sectional view of the periphery of output shaft supporting structure for an automatic transmission according to the embodiment of the present invention.

Hereinafter, preferred embodiments of the present invention will be described with reference to the drawings. FIG. 1 shows a cross sectional view of an entire automatic transmission device. FIG. 2 shows an enlarged cross sectional view of the periphery of an output shaft supporting structure 20 in FIG. 1.

An automatic transmission 10 includes an input shaft 11 which transmits power of an engine (not shown) via a torque converter (not shown), an intermediate shaft 12 coaxially and rotatably disposed relative to the input shaft 11, output shaft 13 coaxially and rotatablly disposed relative to the intermediate shaft 12, three planetary gear sets G1, G2 and G3, five friction engaging elements C1, C2, C3, B1 and B2 transmitting rotational drive force between each shaft or switching transmitting route of rotational driving force via each planetary gear set, a one-way clutch F1 allowing to transmit rotational driving force to one direction and not allowing to transmit rotational driving force to the other direction, a casing 14 accommodating above described parts. In FIG. 1, hatching for the planetary gear sets G1, G2, and G3 and the fiction engaging elements C1, C2, C3, B1 and D2 is omitted for easy understanding.

When the input shaft 11 is rotated in response to the engine rpm, the rotational speed of the input shaft 11 is accelerated or decelerated via the planetary gear sets G1, G2 and G3 and transmitted to the output shaft 13. The acceleration and deceleration of rotational speed of the input shaft 11 is switched over by gear ratio corresponding to a speed change stage. Shifting of the speed change stage is achieved by engagement combination of the friction engaging elements C1, C2, C3, B1 and B2. The friction engaging elements C1, C2, C3, B1 and B2 are engaged or disengaged by controlling supply and discharge of hydraulic pressure.

The output shaft supporting structure 20 is explained with reference to FIG. 2. The output shaft supporting structure 20 includes the output shaft 13 of the automatic transmission having a hollow space 13A whose one end is opened. The open end of the output shaft 13 is disposed in the input shaft 11 side (left side in FIG. 2) and the other end of the output shaft 13 is disposed in away from input shaft 11 side (right side in FIG. 2). The output shaft supporting structure 20 further includes the intermediate shaft 12 whose one end disposed in the input shaft 11 side and the other end having an insert portion 12A which is inserted into the hollow space 13A of the output shaft 13, an extension housing 21 placed on the edge of the other end of the output shaft 13 in the casing 14 covering the main body of the automatic transmission 10, a first bearing 22 disposed between the outer peripheral surface of the output shaft and the inner peripheral surface of the extension housing 21, a second bearing 23 disposed between the inner peripheral surface of the extension housing 21 in the other end of the output shaft 13 and the outer peripheral surface of the output shaft 13, and a third bearing 24 disposed between the outer peripheral surface of insert portion 12A of the intermediate shaft 12 and the inner peripheral surface of the output shaft 13.

In this embodiment, a steel ball bearing is employed for the first bearing 22 and the second bearing 23, and a needle bearing is employed for the third bearing.

A carrier PC 3 of the planetary gear set G3 is held between the outer peripheral surface of the insert portion 12 A in one end side of the intermediate shaft 12 closer than the third bearing 24 and the inner peripheral surface of the hollow space 13A. The axial position of the carrier PC 3 of the planetary gear set G3 is set in the third bearing 24 in axial direction so that a portion of the third bearing 24 can be disposed between the first bearing 22 and the second bearing 23 in axial direction. An external spline PC3S is formed on the outer peripheral surface of the carrier PC3. The external spline PC3S engages with an internal spline 13AS formed in the hollow space 13A. The inner peripheral surface of the carrier PC3 is relatively and rotatably supported on the outer peripheral surface of the insert portion 12A via a bush. In the embodiment, clearance between the internal spine 13 AS of the hollow space 13A and the external spline PC3S of the carrier PC3 in radial direction is set to be larger than distance in the most inclined position of the intermediate shaft 12 relative to center of axis in radial direction.

A gear 12B engaging with a pinion gear S3 of the planetary gear set G3 is formed on the outer peripheral surface of the intermediate shaft 12. The gear 12B serves as a sun gear of the planetary gear set G3. The outer peripheral surface of one end side of the output shaft 13 relatively and rotatably supports the ring gear R3 of the planetary gear set G3 via a bush 26. In the embodiment, the ring gear R3 is fixed to a portion of the one way clutch F1 for unitary rotation with the ring gear R3 and the portion of the one way clutch F1.

Additionally, the other end side of output shaft 13 is fixed on a joint 27, and driving force is set to be transmitted to vehicle wheel via a differential gear (not shown) from the joint 27. Then the diameter of one end of the output shaft 13 is larger than the diameter of the other end of the output shaft 13, therefore, the diameter of one end of the hollow space 13A become larger. A communicating hole 13B extending in the radial direction and communicating with the outer peripheral surface of the output shaft 13 is formed in the other end side of the hollow space 13A. A through-hole 12C which passes through in axis direction is formed on the axis of the intermediate shaft 12. Plurality of passing through holes 12D extending in the radial direction and passing through the outer peripheral surface of the intermediate 12 are formed on the axis of the intermediate shaft 12. Oil can flow inside of the pass through hole 12C and the hollow space 13A. When the intermediate shaft 12 and output shaft 13 rotate, oil flows out to the outer peripheral surface side of each shaft via the communicating hole 13B and 12D by centrifugal force and lubricates each member.

The extension housing 21 is made of aluminum, and the extension housing 21 has a cylindrical portion 21A projected inside of the extension housing 21 in axial direction and an accommodating wall 21B having space for accommodating a piston 28 in the outer diameter side of the cylindrical portion 21A. A steel made parking gear 29 splines with the outer surface of the output shaft 13. In outside of the output shaft 13, the first bearing 22 is disposed between a boss portion of the parking gear 29 and the inner peripheral surface of the cylindrical portion 21A. A steel made annular sleeve 30 is press-fitted between the inner peripheral surface of the cylindrical portion 21A of the extension housing 21 and the outer peripheral surface of an outer race of the first bearing 22.

In the embodiment, when the temperature becomes high in the automatic transmission 10 and the extension housing 21 is thermally expanded, the outer diameter of the annular sleeve 30 is set to be larger than the inner diameter of the cylindrical portion 21A. The annular sleeve 30 is press-fitted into inside of the cylindrical portion 21A. Here, the boss portion of the parking gear 29 is press-fitted into the inner race of the first bearing 22. Then, when the extension housing 21 is fixed to the casing 14, the annular sleeve 30 and the first bearing 22 are fixed by clearance fit.

The steel made second bearing 23 is disposed between the inner peripheral surface of the extension housing 21 and the outer peripheral surface side of the output shaft 13. The position of the second bearing 23 is closer to the other end of the output shaft 13 in axial direction (right side in FIG. 1) than the position of the first bearing 22 in axial direction. When the extension housing 21 is fixed to the casing 14 of the automatic transmission, the outer race 34A of the second bearing 23 is press-fitted into the inner peripheral of the extension housing 21, then the second bearing 23 is disposed between the inner peripheral surface of the extension housing 21 and the outer peripheral surface of the output shaft 13 by fixing the inner lace of the second bearing 23 to the outer peripheral of the output shaft 13 by clearance fit.

According to the above described the output shaft supporting structure 20, since the first bearing 22 supporting the output shaft 13 and the second bearing 23 are fixed to the extension housing 21, the axis of the extension housing 21 is not deviated from the axis of the casing 14 between the first bearing 22 and the second bearing 23 compared to the kwon art in which the casing 14 supports the first bearing 22 and the extension housing 21 supports the second bearing 23. Therefore deviation between the axis of the first bearing 22 and the axis of the second bearing 23 can be minimized.

Additionally, gravity of the planetary gear set G3 is added to the intermediate shaft 12 via the bush 25 from the carrier PC3. Because the intermediate shaft 12 is supported by the output shaft 13 supported by the third bearing 24, the gravity of the planetary gear set G3 is added to the output shaft 13 as the third bearing 24 is a point of support. Here, a position of the third bearing 24 in axial direction is set to be overlapped to a position of the first bearing 22 in axial direction, therefore, inclination of the output shaft 13 generated by supporting the planetary gear set G3 can be prevented. If the position of third bearing 24 in axial direction is closer to one end of the output shaft 13 than a position of the first bearing in axial direction, the output shaft 13 is easy to incline relative to center of axis. However, by receiving the gravity of the planetary gear set G3 between the first bearing 22 and the second bearing 23 supporting the output shaft 13, inclination of the output shaft 13 relative to the center of the axis is prevented. If the intermediate shaft 12 is largely inclined by the gravity of the planetary gear set G3, the inclination is absorbed by clearance provided between the internal spline 13 AS and the external spline PC3S. Therefore, the center of the axis of the output shaft 13 is not largely inclined due to the gravity of the planetary gear set G3.

In the embodiment, by press fitting the annular sleeve 30 into inside of the extension housing 21, generation of clearance between the annular sleeve 30 and the extension housing 21 in radial direction is prevented even when thermally expanded. Since the annular sleeve 30 is separately made from the first bearing 22, before the first bearing 22 is disposed between the output shaft 13 and the extension housing 21, the annular sleeve 30 can be press-fitted into the extension housing 21. Additionally, since the annular sleeve 30 and the first bearing 22 are made of steel, clearance between the annular sleeve 30 and the first bearing 22 in radial direction is hardly generated by thermal expansion. When output shaft 13 rotates, the output shaft 13 is accurately supported relative to the extension housing 21 in spite of temperature change of the automatic transmission. The deviation of the axis of the output shaft 13 is prevented without providing space between the first bearing 22 and the second bearing 23.

What is claimed is:

1. An output shaft supporting apparatus for automatic transmission comprising:

an output shaft whose one end is positioned at an input shaft side and whose other end is positioned away from the input shaft side and having a hollow space opened in the one end side, the output shaft decelerating or accelerating the rotation of the input shaft in response to a gear ratio corresponding to a speed change stage;

an intermediate shaft coaxially disposed relative to the input shaft and whose one end is positioned in the input shaft side and whose other end has an insert portion inserted into the hollow space of the output shaft;

an extension housing placed on the edge of the other end of the output shaft in a casing covering a main body of the automatic transmission;

a first bearing disposed between the outer peripheral surface of the output shaft and the inner peripheral surface of the extension housing;

a second bearing disposed between the inner peripheral surface of the extension housing closer to the other side of the output shaft than the first bearing and the outer peripheral surface of the output shaft;

a third bearing disposed between the outer peripheral surface of the insert portion and the inner peripheral surface of the hollow space, wherein a part of rotational elements of a planetary gear set is supported between the outer peripheral surface of the insert portion closer to one end of the intermediate shaft than the third bearing and the inner peripheral surface of the hollow space, and at least a portion of axial position of the third bearing is located between the first bearing and the second bearing.

2. An output shaft supporting apparatus, according to claim 1, wherein an external spline engaging with an internal spline formed in the hollow space is formed in the outer peripheral surface of rotational elements of the planetary gear set supported between the outer peripheral surface of the insert portion and the inner peripheral surface of the hollow space, and the inner peripheral surface of the rotational element of the planetary gear set is relatively and rotatably supported relative to the outer peripheral surface of the insert portion.

3. An output shaft supporting apparatus, according to claim 1, wherein clearance between the internal spline and the external spline in radial direction is formed in the hollow space and the clearance is set to be larger than distance in the most inclined position of the intermediate shaft relative to the center of axis in radial direction.

4. An output shaft supporting apparatus, according to claim 2, wherein clearance between the internal spline and the external spline in radial direction is formed in the hollow space and the clearance is set to be larger than distance in the most inclined position of the intermediate shaft relative to the center of axis in radial direction.

5. An output shaft supporting apparatus, according to claim 2, wherein the rotational element of the planetary gear set is splined with the inner peripheral surface of the hollow space serves as a carrier, and the intermediate shaft serves as a sun gear engaging with a pinion gear of the planetary gear set, and the outer peripheral surface of one end side of the output shaft relatively and rotatably supports a ring gear of the planetary gear set.

6. An output shaft supporting apparatus, according to claim 3, wherein the rotational element of the planetary gear set is splined with the inner peripheral surface of the hollow space serves as a carrier, and the intermediate shaft serves as a sun gear engaging with a pinion gear of the planetary gear set, and the outer peripheral surface of one end side of the output shaft relatively and rotatably supports a ring gear of the planetary gear set.

7. An output shaft supporting apparatus, according to claim 4, wherein the rotational element of the planetary gear set is splined with the inner peripheral surface of the hollow space serves as a carrier, and the intermediate shaft serves as a sun gear engaging with a pinion gear of the planetary gear set, and the outer peripheral surface of one end side of the output shaft relatively and rotatably supports a ring gear of the planetary gear set.

* * * * *